Feb. 26, 1929.

J. A. CAMPBELL 1,703,571

ABSORPTION TOWER

Filed July 27, 1926　　2 Sheets-Sheet 1

Inventor.
Julian A. Campbell.

Attorney

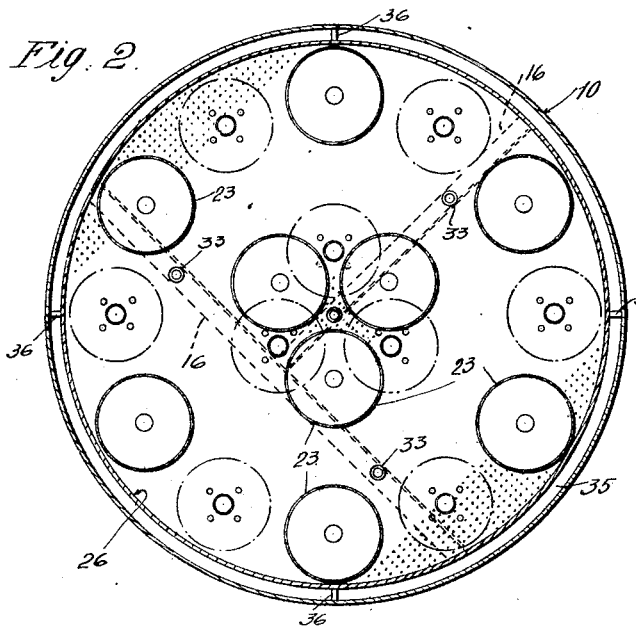
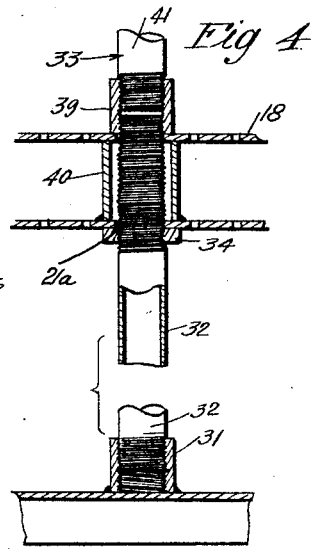
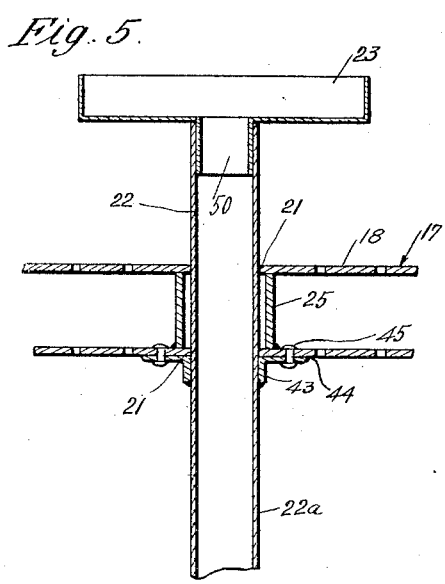
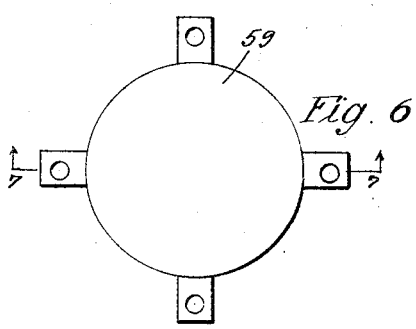
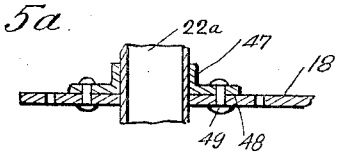

Patented Feb. 26, 1929.

1,703,571

UNITED STATES PATENT OFFICE.

JULIAN A. CAMPBELL, OF LONG BEACH, CALIFORNIA.

ABSORPTION TOWER.

Application filed July 27, 1926. Serial No. 125,302.

This invention has to do generally with devices used in connection with the treatment of oil, and is particularly concerned with the structural characteristics of such devices.

The invention is particularly well adapted for embodiment in structures such as described in my United States Letters Patent on absorbers, Number 1,654,785, issued January 3, 1928; on absorbers Number 1,643,696, issued September 27, 1927, and my co-pending application on absorbers, Serial Number 123,417, filed July 19, 1926, though in no sense is it to be considered limited to such particular embodiments.

Devices of this character are known as "bubble towers," absorbers, and fractionators, and are generally characterized as vertical, cylindrical shells having spaced perforated floors to which oil is delivered from above and to which gas is directed from below. The oil passes downwardly from floor to floor, at each floor coming into intimate contact with the gas flowing upwardly through the floor perforations, all to the advantageous ends well known to those skilled in the art and fully set forth in said copending applications.

In the towers disclosed in the above mentioned applications, there is provided relatively soft packing between each floor and the surrounding shell so there may be no leakage of oil or gas at these junction points, a leakage which would result in a decided loss of efficiency, as will be well understood.

It is among the principal objects of the present invention to eliminate the necessity for this relatively soft packing and yet maintain the necessary tight joints between floors or plates and the defining walls of the mixture chambers. By reason of this elimination, the tower may be used as a fractionator or, in other words, where hot oil is run through. The elimination of the packing is also advantageous when the tower is used as an absorber, for, when the oil being treated has any tendency towards emulsification, there is apt to gather an accumulation of thick sediment or emulsion over the floor plates, which sediment tends to clog the gas-passing apertures and hence tends to chock back the gas with a resulting loss of efficiency. This accumulation of sediment may be flushed out with hot oil but where relatively soft packing is used, the employment of hot oil is precluded. By use of the present invention, however, since the soft packings are eliminated, the hot flushing oil may be used without damaging the apparatus, and hence it is possible to maintain high efficiency at all times by flushing out the tower with hot fluid whenever occasion for such treatment arises.

The structure is also such that it may be fabricated and assembled with ease and dispatch; and, in the event is need be disassembled for inspection, repair or transportation, the disassembly may be accomplished with facility.

Generally, the structure may be characterized as a double-wall shell, the inner wall being made up of sections which serve individually to space the floor plates through which the gas passes and onto or between which the oil is delivered as it passes from top to bottom of the tower, though in some instances the delivery is in the form of froth rather than free liquid. The inner wall is built up section by section, the plates being interposed as the sections are added, and there are provided means within the shell for longitudinally compressing the assembly of plates and section-spacers whereby the individual plates are held tightly between opposed ends of adjacent spacers to form tight joints therebetween.

While the spacers serve to support the floor plates marginally, I find it preferable also to provide columns spaced from the plate edges and arranged to support the floors at such points. The columns are sectional in character so they may be built as the assembly of the floor and spacers progresses.

In the types of tower disclosed in the aforementioned pending applications, there are provided over-flow pipes which extend vertically through the floors, and I have here shown a simple and efficient manner of supporting these pipes and of sealing the floor openings through which they pass.

Other features of novelty and objects of the invention will be made apparent in the following detailed specification, reference being had to the accompanying drawings, in which:

Fig. 2 is a section on line 2—2 of Fig. 1;

Fig. 4 is an enlarged, fragmentary and contracted section showing details of the supporting column;

Fig. 5 is an enlarged fragmentary section through one of the lowermost over-flow pipes;

Figure 1:
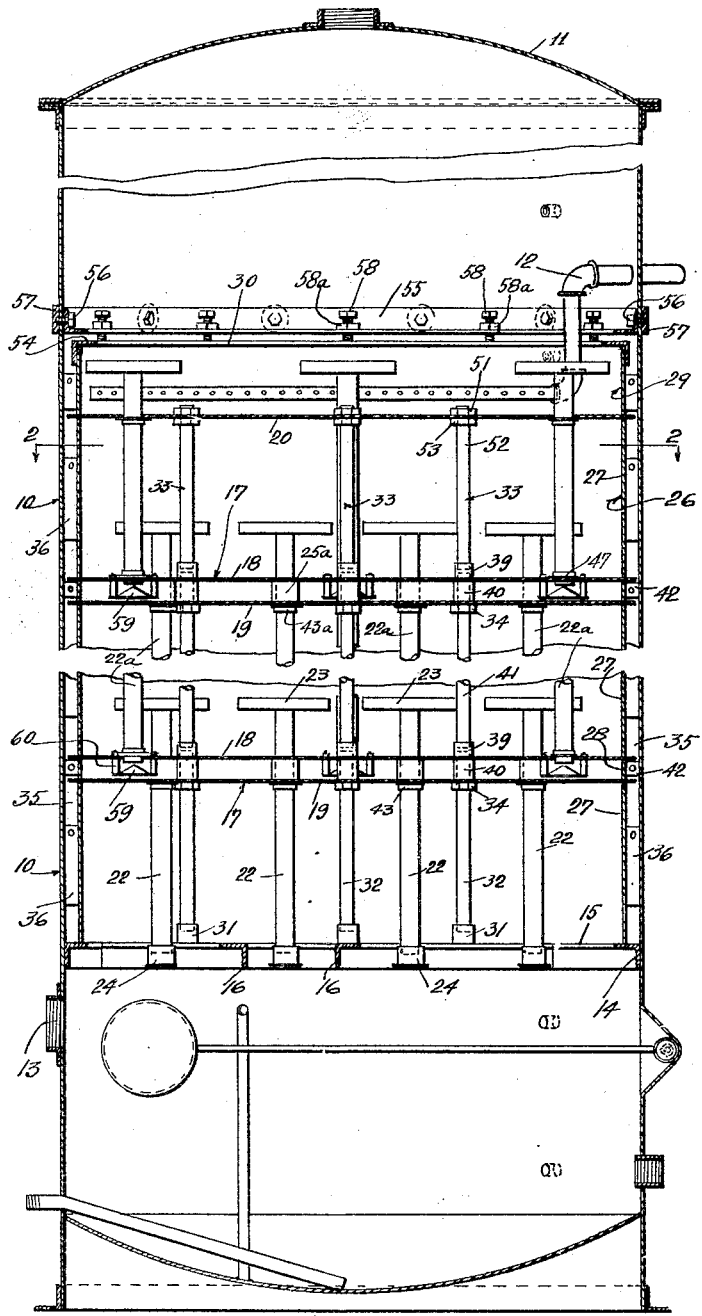
Fig. 1 is a medial sectional view through a tower embodying my invention.
Figure 3:
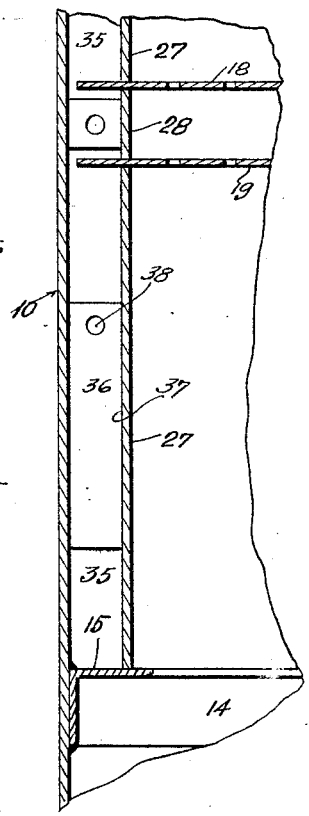
Fig. 3 is an enlarged fragmentary section showing details of the wall and floor structure.

Fig. 5ª is an enlarged fragmentary section through the lower end of one of the upper over-flow pipes;

Fig. 6 is a top plan view of one of the distributers or spreader cones; and

Fig. 7 is a section on line 7—7 of Fig. 6.

In the drawings, numeral 10 indicates the outer shell of a tower embodying my invention, this shell preferably, though not necessarily, being cylindrical in character. The tower has a dome-like top 11 beneath which projects the oil inlet pipe 12. Numeral 13 indicates the inlet for gas, said inlet being arranged near the base of the tower. Welded or otherwise suitably fixed to the inner wall of shell 10 near its bottom is an angle iron ring 14 which presents an upwardly facing, annular shoulder 15; and secured to said supporting ring are the cross bars 16.

While the floors of the tower may be either of the single or double plate type illustrated in the above-mentioned co-pending applications, I have here illustrated the double plate type, that is, each floor 17 is made up of an upper, perforated plate 18 and a lower perforated plate 19 spaced therebelow. Preferably, however, the uppermost floor 20 is a single perforated plate. Each plate is apertured as at 21 to receive over-flow pipes 22, each pipe having an over-flow pan 23 at its upper end, while the pipes depending from the lowermost floor are closed to the passage of gas at their lower ends with sealing cups 24; the purpose and operation of these over-flow devices being fully set forth in the above-mentioned copending applications. Around each aperture 21 of the lower plate of each floor is secured, as by welding, for instance, a spacing tube or pipe 25.

The inner wall or shell generally designated at 26 is sectional in character, the relatively long sections 27 serving as spacers between adjacent floors, while the relatively short sections 28 provide spacers between the plates of a given floor. The uppermost section 29 rests on top floor 20 and spaces said floor from a retention ring 30 which is preferably of angular cross section, as clearly illustrated.

Fixed to bars 16 are the upstanding, internally threaded sockets 31, and the lowermost sections 32 of the sectional supporting columns 33 are threaded into these sockets, lock nuts 34 being threaded down on the column-sections and providing upwardly facing and adjustable shoulders to receive and support the lower plate of the lowermost floor at points spaced inwardly from its periphery.

The lowermost cylindrical shell-section or spacer 27 rests with its lower edge on shoulder 15, the horizontal arm of ring 14 closing the lower end of the annular space 35 which is annularly defined by shell 10 and section 27. In order to center the cylindrical section within shell 10 and hold it positively in centered position, I preferably provide radially extending spacers 36 which are in the form of bars and are preferably secured along their inner edges 37 to the cylindrical spacer in any suitable manner, as, for instance, by welding. These bar-spacers preferably have apertures 38 in their upper ends whereby they may be grasped with tools and therefore easily handled in lowering or raising the sections with respect to shell 10. The overall diameter of the shell sections with their bar-spacers is preferably such that the section assemblies have force-fit within the shell, thus effectively resisting any tendency such sections may have to shift, and aiding in trueing up the outer shell which ordinarily is somewhat out of round as it comes from the factory.

With the lowermost cylindrical section in place, plate 19 of the lowermost floor is lowered onto the upper edges of said section, the upper ends of column sections 32 projecting through apertures 21ª in plate 19 and well above said plate. Lock nuts 34 are threaded up against the lower face of said plate and may aid in leveling the latter. Cylindrical spacer section 28 is then lowered until it comes to rest on plate 19, plate 18 is lowered to said spacer and couplings 39 are screwed on the upwardly projecting ends of column-sections 32 and down against the upper face of plate 18 to force said plate into tight engagement with the upper ends of pipe spacers 40, the lower ends of the latter having been welded or otherwise suitably secured to plate 19 about aperture 21ª. Spacers 40 thus effect tight seals so there may be no leakage through apertures 21ª, and also definitely space and stiffen plates 18 and 19 at points adjacent the columns. Couplings 39 also present upwardly opening, threaded sockets for receiving the lower extremity of the column sections 41 which are similar in all respects to sections 32.

It will be understood that the shorter shell-sections 28 are constructed similarly to sections 27, and have apertured, radially extending spacers 42 affixed thereto in the manner described in connection with radial spacers 36.

While the suspension of the lowermost over-flow pipes 22 from the lowermost floor may be accomplished in any desired manner, preferably these pipes have flanges 43 affixed thereto, said flanges presenting upwardly facing shoulders 44 which contact with the lowermost floor plate 19 and being riveted or otherwise suitably secured to said plate at 45.

The over-flow pipes $22^a$, that is, all pipes but the lowermost, extend through the plates of a given floor (the floor openings 21 through which they pass being sealed by pipe spacers $25^a$, similar in nature and function to spacers 25, and the lowermost plate of the given floor merely contacting with the pipe-carried flanges $43^a$, instead of being riveted to said flanges) and downwardly through the uppermost plate of the floor below the given floor. The lower ends of the pipes carry flanges 47 which present downwardly facing shoulders 48 which rest on top the uppermost plate of the lower floor, and said flanges may be riveted to said floor at 49 (Fig. $5^a$) to prevent subsequent displacement of the pipes.

Over-flow pans 23 carry depending nipples 50 which have sliding fit within the upper ends of pipes 22, $22^a$, placement of the pans in a given set of pipes being delayed until the floor next below has been fully assembled.

The spacer, column and floor units are thus built up step by step until the uppermost, single plate floor 20 has been installed, and nuts 51 are then threaded on the uppermost sections 52 of columns 33 to force said plate tightly to the lock nuts 53 therebelow. Uppermost cylindrical spacer section 29, similar to sections 27 and 28, is then placed on top floor 20, and angle iron retention ring 30 is lowered onto said section so the horizontal leg 54 of the ring engages the upper edge of the section. A pressure-screw carrying ring 55 is then secured to shell 10 by means of cap screws 56 which extend into reinforcing bosses 57 welded or otherwise suitably secured to the outer face of shell 10. Ring 55 carries adjustable pressure screws 58 which are threaded down into engagement with the horizontal shoulder or arm 54 of ring 30, lock nut $58^a$ preferably being provided to hold the screws in adjusted position, the screws thus serving to force the shell sections and intermediate floors into tight, non-leak engagement with one another and, of course, towards the supporting shoulder 15 provided by ring 14. In other words, the sectional-shell and floor assembly is longitudinally compressed and clamped between rings 14 and 30.

It will be noted that while ring 14 closes the lower end of the lowermost annular chamber 35, the upper end of said chamber is in communication with the interior of the tower above ring 30 and consequently with the interior of the compartments annularly, exteriorly defined by the cylindrical spacer sections, for the edges of the floor plates are annularly spaced from shell 10 so there is communication between the several chambers 35.

Due to the communication between the chambers at opposite sides of the inner shell, outer shell 10 takes the working pressure of the tower, while the inner wall, that made up of the sections of cylindrical spacers, is called upon only to take the differential in pressure between inner and outer compartments, it following that the inner wall need not be of any great weight, to obvious advantage. The sectional, cylindrical spacers can be considered, of course, as the inner shell of a double-wall tower.

Beneath the upper plate of each double-plate floor, are suspended cone spreaders 59, the suspension means being of any suitable character, as, for instance, depending bolts 60; the cones being in axial alinement with pipes 22 and serving to spread over the plate below such oil or froth as is delivered from above.

It will be understood the drawings and description are to be considered mererly as illustrative of and not restrictive on the broader claims appended hereto, for various changes in design, structure and arrangement may be made without departing from the spirit and scope of said claims.

I claim:

1. In a structure of the character described, an outer shell, an assembly supported within the shell and characterized as alternately arranged floor and spacer members, adjustable means for placing said assembly under compression in the direction of the spacer axes, and releasable means in addition to the last named means for holding the assembly in adjusted compression.

2. In a structure of the character described, an outer shell, an upwardly facing, internal shoulder on the shell near its lower end, a plurality of super-imposed floors within the shell and above said shoulder, the lowermost floor being supported by said shoulder, substantially cylindrical spacers between adjacent floors, and means for pressing said floors and spacers together and towards said shoulder.

3. In a structure of the character described, an outer shell, an upwardly facing internal shoulder on the shell near its lower end, a plurality of super-imposed floors within the shell and above said shoulder, the lowermost floor being supported by said shoulder, substantially cylindrical spacers between adjacent floors, said spacers being horizontally spaced from said outer shell, and means for pressing said floors and spacers together and towards said shoulder.

4. In a structure of the character described, an outer shell, an upwardly facing, internal shoulder on the shell near its lower end, a plurality of super-imposed floors within the shell and above said shoulder, the lowermost floor being supported by said shoulder, substantially cylindrical spacers between adjacent floors, radially extending spacers between said shell and said cylindrical spacers, and means for pressing said floors and spacers together and towards said shoulder.

5. In a structure of the character described, an outer shell, an upwardly facing, internal shoulder on the shell near its lower end, a plurality of super-imposed floors within the shell and above said shoulder, the lowermost floor being supported by said shoulder, substantially cylindrical spacers between adjacent floors, radially extending spacers between said shell and said cylindrical spacers, and means for pressing said floors and spacers together and towards said shoulder; said radially extending spacers being fixed to the cylindrical spacers and having force fit within the shell.

6. In a structure of the character described, an outer shell, an upwardly facing, internal shoulder on the shell near its lower end, a plurality of super-imposed floors within the shell and above said shoulder, the lowermost floor being supported by said shoulder, substantially cylindrical spacers between adjacent floors, said spacers and floors being horizontally spaced from said shell, and their being communication between the interior of the shell above the uppermost floor and the space defined by said shell and the uppermost spacer, and means for pressing said floors and spacers together and towards said shoulder.

7. In a structure of the character described, a double-wall tower, the walls being horizontally spaced and the inner wall being sectional in character, and super-imposed floors supported between adjacent ends of the wall sections.

8. In a structure of the character described, a double-wall tower, the walls being horizontally spaced and the inner wall being sectional in character, super-imposed floors supported near their edges between adjacent ends of the wall sections; and supporting columns between the floors and spaced appreciably from the edges thereof.

9. In a structure of the character described, a double-wall tower, the walls being horizontally spaced and the inner wall being sectional in character, super-imposed floors supported near their margins between adjacent ends of the wall section; a cross bar beneath the lowermost floor, and columns supported on said bar and adapted to support said floors at points spaced from the edges thereof.

10. In a structure of the character described, an outer shell, a horizontally arranged supporting ring secured to the inner wall of the shell near its lower end, a plurality of removable, perforated floors spaced vertically from one another and supported on said ring, means arranged above the uppermost floor adapted to exert downward pressure on said floors, a cross bar supported by said ring, and columns supported by said ring and supporting said floors at points spaced from their edges.

11. In a structure of the character described, a double-wall tower, the walls being horizontally spaced and the inner wall being sectional in character, super-imposed floors supported near their margins between adjacent ends of the wall sections; a cross bar beneath the lowermost floor, and sectional columns supported on said bar and adapted to support said floors at points spaced from the edges thereof.

12. In a structure of the character described, an outer shell, an assembly of spaced floors and peripheral spacer members within the shell, means for compressing longitudinally the peripheral portions of the floors and the spacers, and columnar means for supporting and relatively spacing the central portions of the spaced floors.

13. In a structure of the character described, an assembly of spaced floors and peripheral spacer members, means for compressing longitudinally the peripheral portions of the floors and the peripheral spacers, spaces between the central portions of the spaced floors, columnar means for supporting and relatively spacing the central portions of the floors, and means associated with said columnar means and adapted to compress the spaced floors endwise against said central spacers.

In witness that I claim the foregoing I have hereunto subscribed my name this 19th day of July, 1926.

JULIAN A. CAMPBELL.

CERTIFICATE OF CORRECTION.

Patent No. 1,703,571.   Granted February 26, 1929, to

JULIAN A. CAMPBELL.

It is hereby certified that error appears in the printed specification of the above numbered patent requiring correction as follows: Page 4, line 97, claim 13, for the word "spaces" read "spacers"; and that the said Letters Patent should be read with this correction therein that the same may conform to the record of the case in the Patent Office.

Signed and sealed this 23rd day of April, A. D. 1929.

(Seal)

M. J. Moore,
Acting Commissioner of Patents.